United States Patent
Tokura et al.

[11] Patent Number: 6,037,411
[45] Date of Patent: Mar. 14, 2000

[54] ACOUSTIC VIBRATIONAL MATERIAL OF FIBER REINFORCEMENT WITH EPOXY RESIN AND EPOXY-REACTIVE POLYBUTADIENE

[75] Inventors: Kunihiko Tokura, Tokyo; Masaru Uryu; Seiji Matsuura, both of Chiba, all of Japan

[73] Assignees: Sony Corporation; Mitsui Petrochemical Industries, both of Tokyo, Japan

[21] Appl. No.: 08/452,064

[22] Filed: May 26, 1995

Related U.S. Application Data

[62] Division of application No. 07/902,772, Jun. 23, 1992, Pat. No. 5,663,220, which is a continuation of application No. 07/550,955, Jul. 11, 1990, abandoned.

[30] Foreign Application Priority Data

Jul. 13, 1989 [JP] Japan .................................. 1-180853

[51] Int. Cl.[7] .............................. C08K 7/02; C08K 7/14; C08L 63/00; G10K 13/00
[52] U.S. Cl. ......................... 525/108; 181/169; 523/467; 523/468; 525/118; 525/119; 525/122; 525/529; 525/531
[58] Field of Search ..................... 523/437, 438, 523/467, 468; 525/108, 118, 119, 122, 529, 531; 181/169

[56] References Cited

U.S. PATENT DOCUMENTS

| | | | |
|---|---|---|---|
| 3,444,121 | 5/1969 | Altier et al. | 260/29.7 |
| 3,616,193 | 10/1971 | Lubowitz et al. | 161/190 |
| 3,853,815 | 12/1974 | Lubowitz | 260/63 R |
| 3,926,903 | 12/1975 | Scola | 260/42.28 |
| 3,927,234 | 12/1975 | Lindner | 428/373 |
| 3,931,354 | 1/1976 | Shephard et al. | 260/836 |
| 4,002,599 | 1/1977 | Graham | 528/112 |
| 4,016,022 | 4/1977 | Browning et al. | 525/122 |
| 4,028,432 | 6/1977 | Dawans et al. | 260/836 |
| 4,269,759 | 5/1981 | Edelman | 260/42.17 |
| 4,340,715 | 7/1982 | Gounder et al. | 528/99 |
| 4,443,566 | 4/1984 | Ying | 523/468 |
| 4,734,323 | 3/1988 | Sato | 428/317.3 |
| 4,780,507 | 10/1988 | Gaku et al. | 525/331.9 |
| 4,879,328 | 11/1989 | Karasawa et al. | 524/109 |
| 5,102,729 | 4/1992 | Yamaguchi et al. | 428/290 |
| 5,164,260 | 11/1992 | Yoshinaka et al. | 428/328 |

FOREIGN PATENT DOCUMENTS

| | | |
|---|---|---|
| 0 149 357 A2 | 7/1985 | European Pat. Off. . |
| 55-115794 | 9/1980 | Japan . |

OTHER PUBLICATIONS

Database Japs, Japanese Patent Office, vol. 11, No. 396 (E–568) and JP–A–62157500 (Agency of Ind. Science and Technology) Jul 13, 1987, abs. date Dec. 24, 1987.

Database WPI, abs. No. 80–74373c, Derwent Publications Ltd., London, GB and JP–A–55115794 (Toray Ind. Inc.) Feb. 17, 1979.

*Primary Examiner*—Robert E. Sellers
*Attorney, Agent, or Firm*—Limbach & Limbach LLP

[57] ABSTRACT

This invention provides an acoustic vibrational material containing various fibers as the reinforcement material and having the epoxy resin as the matrix resin, wherein the epoxy resin is modified by a polybutadiene base elastomer containing not less than 90 mole percent of 1,2-linked units. The epoxy resin modified with the above polybutadiene elastomer exhibits a maximum value of loss coefficient at the temperature region near the room temperature. Thus compatibility between large internal loss and high elastic modulus is achieved.

5 Claims, No Drawings

ACOUSTIC VIBRATIONAL MATERIAL OF FIBER REINFORCEMENT WITH EPOXY RESIN AND EPOXY-REACTIVE POLYBUTADIENE

This is a divisional of Application Ser. No. 07/902,772, filed Jun. 23, 1992, U.S. Pat. No. 5,663,220, which is a continuation of Ser. No. 07/550,955, Filed Jul. 11, 1990, now abandoned.

BACKGROUND OF THE INVENTION

This invention relates to an acoustic vibrational material formed of a fiber reinforced epoxy resin and used for a speaker, a diaphragm or the like.

Various properties are required of the acoustic vibrational materials used in speakers, diaphragms, etc. in pursuit of a reproduced sound of a higher quality. One of these is the larger longitudinal wave propagation velocity [=(specific modulus of elasticity)$^{1/2}$=(Young's modulus/density)$^{1/2}$]. To this end, a material having a higher Young's modulus and a lesser density is preferred. Simultaneously a larger internal loss is also required for absorbing the abnormal sound or distortion component produced with divisional vibrations.

It is however customary that the material having a higher Young's modulus and a larger longitudinal wave propagation velocity undergoes a lesser internal loss so that it is difficult to satisfy these contradictory conditions simultaneously in a single material. Therefore, the present situation is that one of these properties has to be preferred depending on the usage, such as low sound reproduction or high sound reproduction.

It has recently been attempted to solve the above problem by the combination of several materials. An example is the use of a composite material having various fibers, such as the carbon, aramid, glass or polyolefin resin fibers, as the reinforcement material. Above all, attention is directed to ultra-drawn polyethylene fibers as the fiber reinforcement material because they undergo larger internal losses and are superior in transient characteristics while being lesser in the characterization of the playback sounds. In most cases, it is used in a composite form with epoxy resin.

However, the above mentioned composite materials cannot be said to ensure the practical properties satisfactorily. Although the fiber reinforcement material consisting of a material undergoing larger internal losses has recently been evolved, the present situation is that, since the epoxy resin compounded with the material is not sufficiently high in internal losses, the shortage in the internal losses has to be compensated by constructional artifices in the diaphragm or fine adjustment of various parts after speaker assembling.

SUMMARY OF THE INVENTION

It is therefore an object of the present invention to provide an acoustic vibrational material in which internal losses are increased without imparing the modulus of elasticity.

The present invention has been proposed to accomplish the above object and provides an acoustic vibrational material containing a fiber reinforced material and an epoxy resin binding it, characterized in that the epoxy resin is modified by a polybutadiene elastomer containing not less than 90 mole percent of 1, 2-linked units.

In view of the necessity for optimum compatibility between the internal losses and the modulus of elasticity, it is necessary to inspect the temperature dependency of the two to select the material which will give the best balance between the two at or near room temperature.

According to the present invention, the material with the contents of the 1,2-linked units of not less than 90 mole percent is employed. The polybutadiene containing mainly the 1,2-linked units has the glass transition point of changes of various physical properties at or near 0° C. such that the loss coefficient of the modified epoxy resin (elastomer modified epoxy resin) shows a temperature dependency having the maximum peak near 10° C. Although slightly lower at the room temperature (20° C.), the loss coefficient is maintained at a sufficiently high value. On the other hand, although the modulus of elasticity is inevitably decreased with increase in temperature, the decrease in the modulus of elasticity at or near room temperature is low when the above elastomer is used.

Conversely, the loss coefficient of the epoxy resin modified by the polybutadiene elastomer mainly containing 1,4-linked units shows a temperature dependency exhibiting a maximum peak in the vicinity of −50 to −30° C. markedly lower than room temperature such that the loss coefficient at room temperature is lowered. Moreover, the decrease of the modulus of elasticity in the vicinity of room temperature is considerable.

Therefore, with the epoxy resin modified by using an elastomer consisting mainly of 1,2-linked units, it becomes possible to achieve a compatibility between the high internal losses and the high modulus of elasticity at room temperature.

Should the acoustic vibrational material made of such epoxy resin be applied to a speaker diaphragm, the reproduced sound of a higher quality may be achieved since the playback frequency range may be enlarged, abnormal sounds or the distortion components due to divisional vibrations may be absorbed and the transient characteristics may be improved.

DETAILED DESCRIPTION OF THE INVENTION

Attempts have been made in many fields to impart flexibility and high toughness to hard and brittle epoxy resins. One of such attempts is modifying by a polybutadiene elastomer. However, with the conventional elastomer modification, the modulus of elasticity of the epoxy resin is lowered so that a satisfactory longitudinal wave propagation velocity cannot be obtained. Thus the conventional elastomer modification is unsuitable in case the application to an acoustic vibrational material is considered. As a result of the investigations by the present inventors into the elastomer modification properties of the epoxy resins having suitable properties as the acoustic vibrational material, it has been found that the modulus of elasticity is decreased markedly at room temperature mainly when the units of the polybutadiene elastomer are 1,4-linked and the internal losses may be increased without markedly imparing the modulus of elasticity when not less than 90 mole percent of the units are 1,2-linked, whereas the case in which the contents of the 1,2-linked units less than 90 mole percent is not desirable because the modulus of elasticity is lowered.

According to the present invention, elastomer modification is accomplished by incorporating a polybutadiene elastomer into the molecular chains of the epoxy resin by a preliminary reaction or by simply blending the epoxy resin and the polybutadiene elastomer and reacting part or all of the polybutadiene elastomer during curing. Which of these methods is employed depends on the working method and usage. When incorporating the elastomer into the molecular chains of the epoxy resin during the preliminary reaction, it is necessary for the polybutadiene elastomer to have functional groups capable of reacting with an epoxy rersin at both terminals of the principal chains. For example, a reactive polybutadiene elastomer having functional groups such as hydroxyl groups, carboxyl groups or thiol groups, or structures such as primary, secondary or tertiary amines or acid anhydrides at the terminals of the principal chain may be employed.

The polybutadiene elastomers may preferably be employed in a range of 10 to 25 mole percent based on the epoxy resin. With the elastomer amount less than the above range, the effect of addition of the polybutadiene elastomer is not displayed, whereas, with the elastomer amount exceeding the above range, the relative contents of the epoxy resin may be lowered to impare the intrinsic properties of the epoxy resin.

The general-purpose materials may be used as the epoxy resin without any limitations.

As the fiber reinforcement materials, any customary materials may be employed, such as aramid, glass, carbon or ultra-drawn polyethylene fibers, or polyallylates (liquid crystal polymers).

A preferred embodiment of the present invention will be explained with reference to experimental examples.

Initially, the epoxy monomer and the elastomer were reacted preliminarily to produce the elastomer modified epoxy resin.

As the epoxy monomer, the tri-functional glycidyl amine epoxy monomer (prepared by Sumitomo Chemical Co., Ltd.; trade name, Sumi-epoxy ELM-100) was used, whereas, as the elastomer, CTB (produced by Nippon Soda Co., Ltd.; trade name, Nisso Polybutadiene C-1000) was used. The contents of the 1,2-linked units in the elastomer were 95 mole percent. The structure of the epoxy monomer and the elastomer are as follows:

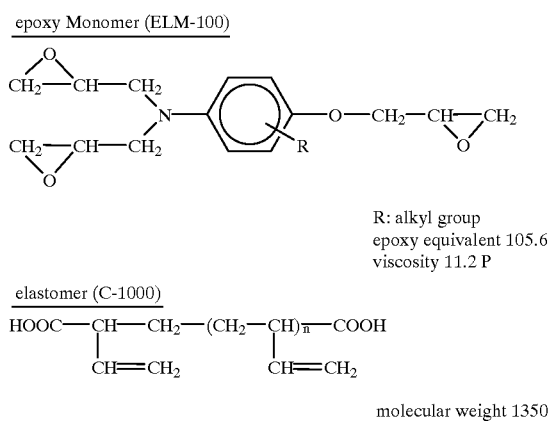

R: alkyl group
epoxy equivalent 105.6
viscosity 11.2 P elastomer (C-1000)

molecular weight 1350

The above epoxy monomer and the elastomer were mixed at a ratio shown in Table 1 and reacted under stirring at 110° C. The progress of the reaction was followed by measuring the decrease of the concentration of the carboxyl groups by titration with a 0.1N KOH solution in methanol. The synthesized elastomer modified epoxy resin presented a transparent single phase.

To the above elastomer modified epoxy resin were added 4-methylhexahydrophthalic anhydride (prepared by Shin-Nippon Rika Co., Ltd.; trade name, MH-700) as a hardener and 2,4,6-tris(dimethylaminomethyl)phenol were added as an accelerator at a ratio shown in Table 1. After molding, heating and curing was made at 120° C. for 20 minutes to produce test pieces a to d each 5 mm wide, 50 mm long and 2 mm thick.

Meanwhile, phr (per hundred resin) in the columns of the hardner and the accelerator in Table 1 stands for the units of addition (weight parts) to 100 weight parts of the elastomer modified epoxy resin.

Table 1 shows the results of measurement of the dynamic viscoelasticity and Q value (reciprocal of the internal loss tan δ) with the aid of the viscoelasticity meter (manufactured by the Orientec Co., Ltd.; trade name, Rheo Vibron). The measurement conditions are 110 Hz and 20° C.

For comparison, a test piece e was similarly prepared using an unmodified epoxy resin and tested in the similar manner. The results are also shown in Table 1.

TABLE 1

| test pieces | epoxy monomer (molar ratio) | elastomer C-1000 (molar ratio) | hardener MH-700 (phr) | accelerator (phr) | dynamic viscoelasticity (dyn/cm$^2$) | Q value |
|---|---|---|---|---|---|---|
| a | 3.0 | 1 | 49 | 2 | $1.04 \times 10^{10}$ | 9.4 |
| b | 4.0 | 1 | 55 | 2 | $1.37 \times 10^{10}$ | 12.1 |
| c | 5.3 | 1 | 72 | 2 | $1.67 \times 10^{10}$ | 15.4 |
| d | 6.7 | 1 | 81 | 2 | $1.93 \times 10^{10}$ | 19.6 |
| e | 100 |   | 160 | 2 | $2.97 \times 10^{10}$ | 34.5 |

It is seen from Table 1 that the value of the dynamic viscoelasticity and the Q value are both lowered with relative increase in the amount of the elastomer employed, the rate of decrease of the dynamic viscoelasticity is small as compared with the rate of decrease of the Q value and that the internal losses are increased at a ratio exceeding the rate of decrease of the dynamic viscoelasticity.

The elastomer modified epoxy resin as the matrix resin was impregnated in a cloth woven from the ultra-drawn polyethylene fibers, referred to hereinafter as SDPE cloth, to produce a composite material.

The SDPE cloth is prepared by using ultra-drawn polyethylene fibers (1000 denier/100 filaments, yarn diameter 40 μm; produced by Mitsui Petrochemicals Industries, Ltd.; trade name, Techmilon) at a density of 17 yarns/25 mm for both the warp and the weft yarn and subsequently subjected to plasma processing.

As the matrix resin, the elastomer modified epoxy resins used at the time of preparing the above mentioned test pieces c and d were used. For preparing the composite material,. two SDPE cloths were cut to a size of 100×100 mm and impregnated with the matrix resin. They were then clamped between two teflon coated iron plates heated to 120° C.with a spacer 0.5 mm thick in-between to perform a heating curing process for 20 minutes. They were then cut each to a size of 5×50 mm to produce test pieces C and D for the composite material.

By way of a comparative example, a test piece E of the composite material having the unmodified epoxy resin used for preparing the test piece e as the matrix resin was similarly produced.

The values of the dynamic viscoelasticity and the Q values of the test pieces C, D and E of the composite material thus produced were measured. The results are shown in Table 2.

TABLE 2

| test pieces | matrix resin | dynamic viscoelasticity (dyn/cm$^2$) | Q value |
|---|---|---|---|
| C | c (elastomer modified) | $10.3 \times 10^{10}$ | 45.3 |
| D | d (elastomer modified) | $10.7 \times 10^{10}$ | 49.2 |
| E | e (unmodified) | $10.2 \times 10^{10}$ | 60.6 |

The values of the dynamic viscoelasticity of the test pieces C and D of the above composite material were increased markedly as compared with the values of the test pieces c, d and e composed of the elastomer modified epoxy resins or only of epoxy resins. It is noted that the values of the dynamic viscoelasticity of the test pieces C and D of the composite material are similar despite the difference in the relative amount of addition of the elastomers and are equivalent to the value of the test piece E of the composite material employing the unmodified epoxy resin. It follows from this that the modulus of elasticity of the fiber reinforced epoxy resin is not substantially changed by the elastomer modification. On the other hand, the Q value is decreased with increase in the relative amount of addition of the elastomer so that the internal losses are increased.

Meanwhile, with the above mentioned elastomer modified epoxy resin, it was shown upon observation through an electron microscope that the portion lowered in polarity due to elastomer introduction is coagulated to produce a micro phase separation in the resin and that the coagulated portion intruded into the micro-pores on the surface of the ultra-drawn polyethylene fibers. It was seen from a further test that adhesivity between the matrix resin and the fiber reinforcement material was markedly improved by the above intrusion and it may be thought that the effect in reducing the distortion on application to an acoustic diaphragm would be outstanding.

What is claimed is:

1. A speaker diaphragm, comprising an acoustic vibrational material wherein the acoustic vibrational material comprises a fiber reinforcement material and an epoxy resin wherein 10 to 25 mole percent of the epoxy resin comprises a polybutadiene elastomer containing not less than 90 mole percent of 1,2-linked units, and wherein the polybutadiene elastomer has principal chain terminals, the terminals having functional groups selected from the group consisting of hydroxyl, carboxyl, thiol, acid anhydride, primary amine, secondary amine and tertiary amine, the polybutadiene elastomer being incorporated into the molecular chains of the epoxy resin.

2. The speaker diaphragm of claim 1 wherein the elastomer of the acoustic vibrational material is blended with the epoxy resin allowing a part or all of the elastomer to react during curing.

3. The speaker diaphragm of claim 1 wherein the elastomer of the acoustic vibrational material is incorporated into the molecular chains of the epoxy resin by reacting the elastomer with the epoxy resin prior to curing the epoxy resin.

4. The speaker diaphragm of claim 1 wherein the fiber reinforcement material of the acoustic vibrational material is selected from the group consisting of aramid fiber, glass fiber, carbon fiber, ultra-drawn polyethylene fiber and polyallylates.

5. The speaker diaphragm of claim 1 wherein the acoustic vibrational material comprises:

fiber reinforcement material; and an elastomer modified epoxy resin bound to the fiber reinforcement material, the resin formed by reacting a tri-functional glycidyl amine epoxy monomer with a polybutadiene elastomer containing 95 mole percent 1,2 linked units and having carboxyl principal chain terminal groups, wherein said elastomer is present in a range of 10 to 25 mole percent based on said epoxy monomer.

* * * * *